United States Patent [19]

Shelton et al.

[11] Patent Number: 5,222,034
[45] Date of Patent: Jun. 22, 1993

[54] MEASURING METHOD AND APPARATUS

[76] Inventors: Russell S. Shelton, 9 Park Ave.; Klaus Ulbrich, 4 Main St., both of Flanders, N.J. 07836

[21] Appl. No.: 594,145

[22] Filed: Oct. 10, 1990

[51] Int. Cl.$^5$ .............................................. G01B 21/20
[52] U.S. Cl. ...................................... 364/559; 33/503
[58] Field of Search ................... 364/559, 560; 33/503, 33/504; 73/651

[56] References Cited

U.S. PATENT DOCUMENTS

| | | | |
|---|---|---|---|
| 4,397,188 | 8/1983 | Bansevichus et al. | 73/651 |
| 4,437,151 | 3/1984 | Hurt et al. | 364/560 |
| 4,629,957 | 12/1986 | Walters et al. | 73/651 |
| 4,799,170 | 1/1989 | Nakaya et al. | 364/560 |
| 4,835,718 | 5/1989 | Breyer et al. | 364/560 |
| 4,866,643 | 9/1989 | Dutler | 364/560 |
| 5,016,199 | 5/1991 | McMurtry et al. | 364/560 |

*Primary Examiner*—Paarshotam S. Lall
*Assistant Examiner*—Ellis B. Ramirez
*Attorney, Agent, or Firm*—Beveridge, DeGrandi, Weilacher & Young

[57] ABSTRACT

A coordinate measuring machine obtains accurate readings by analyzing the mechanical vibrations which occur between a contact point where a probe contacts a workpiece and a readout point where a position-sensing device produces signals indicative of the relative positioning between the probe and the workpiece. The position-sensing device produces an oscillating signal due to the mechanical vibrations. A set of sequential readings is taken of this oscillating signal, and an average of these sequential readings is calculated to produce a final output signal which substantially represents an equilibrium position of the vibrations. The routine for producing the final output signal is triggered in response to the deceleration which occurs when the probe contacts the workpiece.

14 Claims, 2 Drawing Sheets

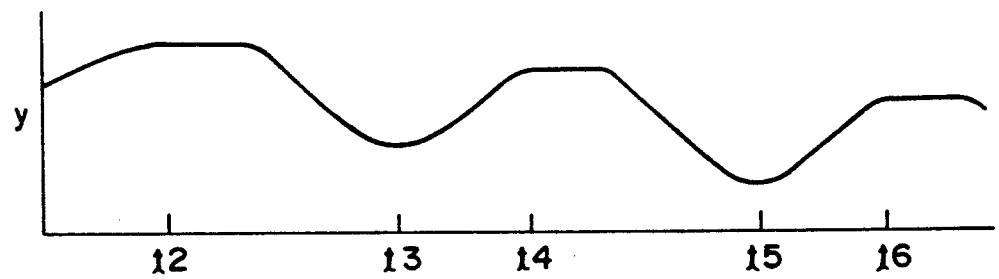
FIG.4a
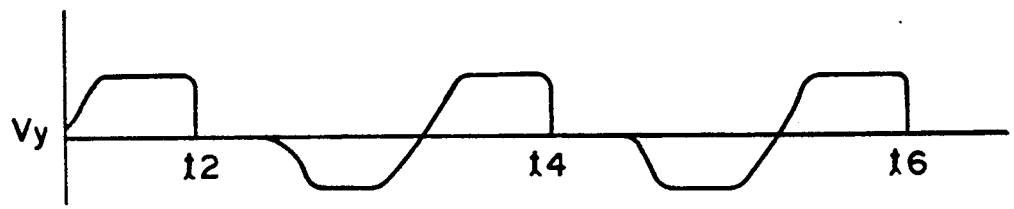
FIG.4b
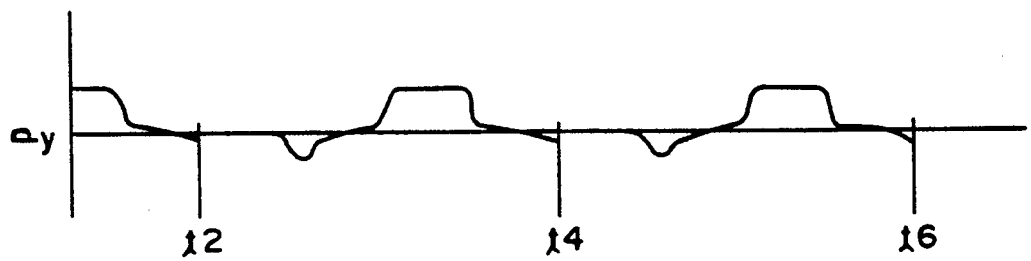
FIG.4c
FIG.5
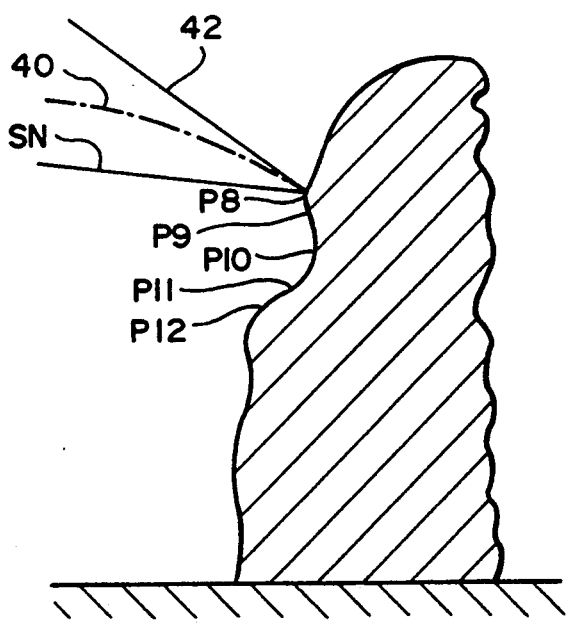
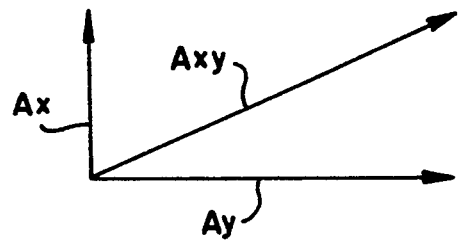
FIG.6

MEASURING METHOD AND APPARATUS

BACKGROUND OF THE INVENTION

This invention relates to coordinate measuring machines. A coordinate measuring machine typically has a workpiece-contacting probe mounted on a probe support which is relatively movable with respect to the workpiece support. Position-sensing devices are used to sense the position of the probe support relative to the workpiece support.

In early coordinate measuring machines, a ball-tipped stylus or other workpiece-contacting member was fixed directly to the probe supporting head. Such machines are now referred to in the industry as hard probe machines. More recently, probes for high accuracy coordinate measuring machine have been designed to generate signals in response to probe-workpiece contact. In some cases piezoelectric sensors or touch-trigger probes are used, while other probes provide analog signals representing displacements which occur within the probes. As these modern probes have evolved, the industry has moved away from hard probe machines and toward more expensive probes and related equipment, in the belief that coordinate measuring machines with hard probes are unsuitable when a high degree of accuracy is important.

The present invention involves a departure from conventional thinking in the metrology industry, in the respect that it offers high accuracy when using a hard probe. Rather than relying on signal-generating probes, the present invention involves an analysis of signals from the position-sensing devices to determine the relative positions, velocities and accelerations of the probe and workpiece. The position-indicating signals oscillate due to mechanical vibrations resulting from probe-to-workpiece contact, in the components between the point of probe-workpiece contact and the position-sensing devices. Sets of sequential position-indicating signals are recorded, and calculations are performed on them to determine when the probe contacts the workpiece, and to determine the neutral or equilibrium position of the vibrations, thus providing an accurate output signal even before the vibrations have ceased.

The present invention allows coordinate measuring machines equipped with hard probes to become more accurate and sophisticated.

SUMMARY OF THE INVENTION

This invention now pertains to improvements to a hard probe coordinate measuring machine, i.e., a machine which has a workpiece supporting means, a rigid probe rigidly mounted on a probe supporting means, scales or other means for providing signals indicating the positions of the probe and workpiece supports relative to each other as the probe is manually moved from one contact point to another on the workpiece, and means for recording signals from the position-indicating means.

In its broadest sense, the invention involves the improvement wherein such a hard probe machine, includes means for recording and processing a set of sequential position-indicating signals from the position-sensing means to produce a final position-indicating signal.

A more specific aspect of the invention is based upon the knowledge that movement of the probe into contact with the workpiece produces mechanical vibrations between the position-sensing means and a point where the contacting end of the probe touches a workpiece, whereby the amplitudes of these vibrations are included in the recorded position-indicating signals. In accordance with this aspect of the invention, a calculating means takes an average of the recorded signals or performs other calculations to produce a final position-indicating signal which substantially represents an equilibrium position of the vibrations sensed by the position-sensing means.

Another significant feature of the invention relates to the manner of triggering the means for producing a final position-indicating signal. In this respect, the invention involves means for deriving, from the recorded position-indicating signals, the deceleration of the relative movement, and for triggering the means for producing a final position-indicating signal when the determined deceleration reaches a threshold value indicating that the probe has contacted a workpiece. This feature of the invention avoids the element of judgment normally associated in hard probe machines, requiring an operator to use his or her judgment in determining when to record the position-indicating signals.

When the production of a final position-indicating signal is triggered in response to deceleration, it is desirable to provide safeguards to prevent false triggering. To reduce a risk of false triggering when deceleration is due to aggressive movement by an operator rather than by contact of the probe with a workpiece, the means for producing the final signal is enabled only when the velocity of the probe support relative to the workpiece support is below a predetermined maximum value. To prevent false triggering when an operator releases the probe and it decelerates due to friction, the means for producing the final signal is enabled only when the deceleration occurs within a predetermined minimum period of time. Further, to prevent false triggering due to environmental vibrations, the means for producing the final signal is enabled only when the velocity is above a predetermined minimum value.

Another feature of the invention relates to the operation of the machine in a scanning mode, when an operator moves the probe manually along and in contact with the workpiece surface. In the scanning mode, the final position-indicating signals are automatically periodically produced.

Means may be provided to initiate the scanning mode automatically in response to movement which is lateral with respect to a "surface normal line," i.e., a line which is normal to the workpiece surface at a point which is contacted by the probe. The means for initiating the scanning mode may be enabled when the probe contacts a workpiece, and it may be disabled a short predetermined time after the probe contacts a workpiece to avoid false initiation of the scanning mode if an operator is moving the probe back and then laterally between each data point.

Another feature of the invention is that the machine has means for producing, from the recorded position-indicating signals, vector-indicating signals which indicate the location of a surface normal line, i.e., a line which is normal to the workpiece surface at a point which is contacted by the probe.

A further feature of the invention is the provision of means for producing, from the recorded position-indicating signals, a direction-of-touch signal which indicates the direction of movement immediately prior to the contact of the probe with a workpiece.

BRIEF DESCRIPTION OF THE DRAWING

FIG. 4a shows the position-indicating signal from the Y-axis reading head during the procedure of FIG. 3.

FIG. 4b shows the Y-axis velocities during the procedure of FIG. 3.

FIG. 4c shows the Y-axis accelerations during the procedure of FIG. 3.

FIG. 5 is a simplified illustration showing the track of a probe which is manually moved to scan a workpiece.

FIG. 6 shows the resolution of vibration amplitude values to determine the locus of the surface normal line at a data point.

DETAILED DESCRIPTION

Figures 1, 2, 3:
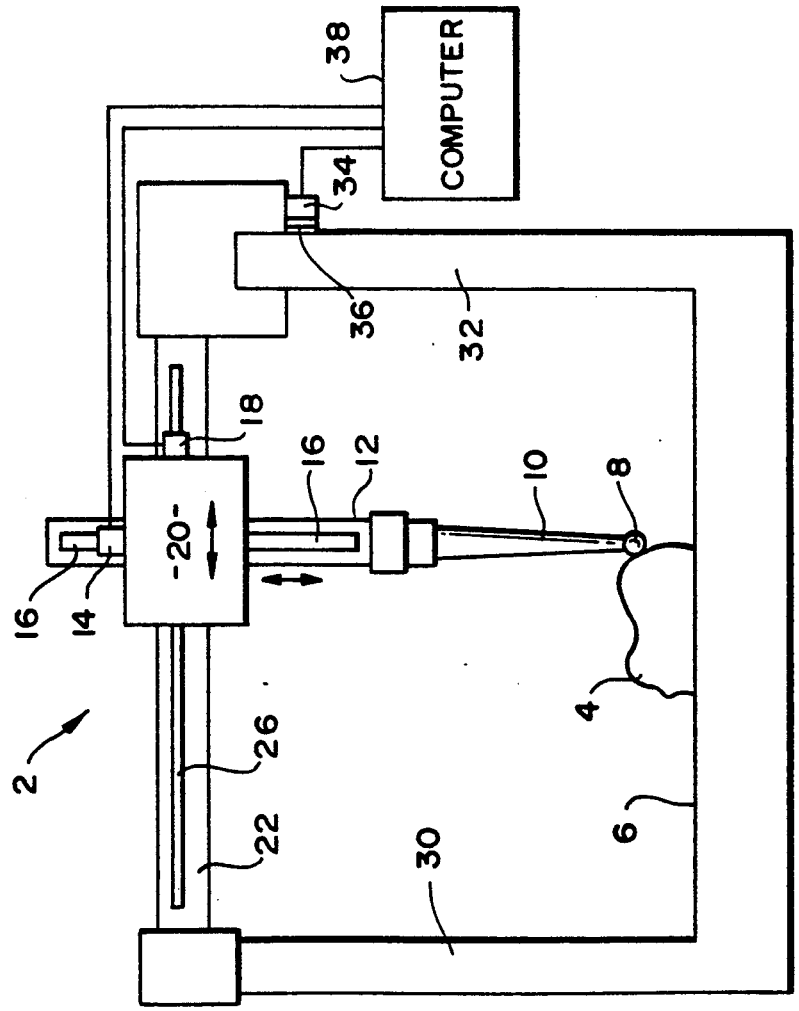
FIG. 1 is a schematic view of a coordinate measuring machine constructed and operated in accordance with the invention.
FIG. 2 shows an analog position-indicating signal from a reading head of the machine, during the mechanical vibrations which occur when the probe contacts the workpiece.
FIG. 3 is a simplified illustration of a procedure during which a probe is manually moved to three data points on a workpiece.

FIG. 1 shows a coordinate measuring machine 2 in which a workpiece 4 on a support 6 is contacted by a ball tip 8 of a hard probe 10. The probe 10 is movable relative to the workpiece support 6. The probe 10 is rigidly mounted on a head on the Z-ram 12 of the machine, and the location of the ball tip 8 in the Z-axis direction is available from a reading head 14 which reads linear positions along a scale 16.

Another reading head 18 is mounted on the Y-carriage 20 which is movable along the Y-rail 22. The position of the probe 10 in the Y-axis direction is obtained from the reading head 18 which provides output signals indicating its linear position along the scale 26 which extends longitudinally of the Y-rail 22.

X-axis movement of the probe 10 and workpiece-contacting stylus tip 8 is in a direction perpendicular to the plane of the paper in FIG. 1, and this movement is facilitated by bearings which ride along the upstanding longitudinal guide rails 30 and 32. In this instance, a movable reading head 34 is used to read linear positions along a stationary X-axis scale 36. In the foregoing respects, the apparatus is conventional.

In simple machines of the type shown in FIG. 1, the probe can be moved by hand to bring the tip 8 of the probe 10 into contact with the workpiece 4. Before contact, the probe will be moving at a finite speed. At the instant the probe touches the workpiece, inertia of the machine components will generate vibrations, and these vibrations manifest themselves as oscillatory signals from the reading heads 14, 18 and 34. During this vibratory movement, the probe tip 8 remains in physical contact with the workpiece, so the magnitude of the oscillating signals is equal to the vibratory motion in the mechanical components between the respective position-sensing devices 14, 18, 34 and the stationary point at which the probe tip 8 contacts the workpiece 4. The signal oscillations initially have a maximum amplitude and, with time, their amplitudes decay toward a neutral position.

Rather than waiting for the oscillations to decay fully or to determine arbitrarily when to take a reading, the present invention uses a computer 38 programmed to analyze the oscillating output signals from the position-sensing devices. The computer records a set of sequential readings of the reading head output signal at time intervals which are substantially shorter than the vibratory frequency. This set of signals is totalled and averaged to produce a final value which substantially represents the null/equilibrium point of the vibrations, and a signal corresponding to this final value is recorded for the particular data point. Similar analyses are performed simultaneously on signals from all three reading heads. To expedite the machine operations, the operator can back the probe away from the contact point before the vibratory motion has stopped.

For purposes of describing an important principle of the invention, FIG. 2 shows an idealized signal from the X axis position sensor 34. It is a sinusoidal oscillating analog signal $x_a$ which varies with time t. The computer reads the signal $x_a$ at short intervals during each oscillatory cycle to obtain a set of sequential digital readings $x_1, x_2, x_3, \ldots, x_n$. The computer takes an average of these signals using the formula:

$$\frac{x_1 + x_2 + x_3 + \ldots + x_n}{n} = x_f$$

where $x_f$ is the final signal which substantially represents an equilibrium X-axis position of the position-sensing device. This final signal $x_f$ is recorded and/or displayed by the computer or a peripheral device. Simultaneously and in a similar manner, readings from the Y axis head and the Z axis head are being processed by the computer.

Thus, it can be seen that the system computer processes signals from the machine scales quickly to track the oscillations, and it takes an average of these oscillations over a sufficient period of time to provide a predictable location of the neutral position of the reading head relative to its respective scale. In this manner, a manual coordinate measuring machine using a hard probe is able automatically to sense a workpiece and to provide data points which are significantly more accurate than anything previously attainable with such hard probe machines.

Rather than taking frequent readings during each vibratory cycle, the computer may be programmed to record readings only when the analog signal is at its maximum and minimum values, so that a set of these maximum and minimum values can be averaged to arrive at the final reading.

The computer is programmed to discriminate between velocity variations which occur during normal manual operation and the vibrations which occur when a workpiece is contacted. The means for producing final position-indicating signal can be triggered automatically when the latter occurs.

Preferably, the calculation and recording of the final position-indicating signal is triggered automatically in response to deceleration of movement between the probe support and the workpiece support. The computer determines deceleration from position-indicating signals received from the reading heads 14, 18, and 34. When the deceleration reaches a threshold value indicating that the probe tip has contacted a workpiece, this triggers the routine to produce a final position-indicating signal.

By way of example, FIG. 3 shows the movement of a probe tip of theoretical infinitesimal size moving in the Y-Z plane to and from three data points P2, P4, and P6. From an initial position P1, the probe moves to data point P2, to a retracted point P3, to a second data point P4, to a retracted position P5, to a third data point P6, and to a retracted position P7.

FIG. 4a shows the analog Y-axis values the computer receives from the reading head 18 at the respective times t2, t3, t4, t5, and t6 when the probe is at points P2, P3, P4, P5 and P6. The computer digitally records these position-indicating values at constant time intervals, it records the digitized values of y and it calculates the velocities and accelerations from the recorded position-indicating signals. The Y axis velocities $v_y$ are shown in FIG. 4b, and the Y axis accelerations $a_y$ are shown in FIG. 4c. A negative acceleration value represents deceleration of the movement between the probe tip and the workpiece.

When the probe tip approaches point P2 on the workpiece, the operator has begun to decelerate the Y-axis movement in anticipation of the probe-to-workpiece contact. When contact occurs, the probe tip location y becomes constant, its velocity Vy drops to zero, and deceleration occurs to create the negative spike shown at t2 in FIG. 4c before its acceleration value goes to zero. The deceleration spike at the time of contact t2 exceeds a threshold value which indicates that contact has occurred. This triggers the computer routine which produces the final position-indicating signal, for example by averaging the set of sequential digital readings which are recorded while the analog output of the reading head 18 is oscillating due to mechanical vibrations in the apparatus.

Deceleration-responsive triggering is desirable because it is not dependent on the operator's judgment as to when a reading can be taken. However, it raises some risks of false triggering unless precautions are taken. When an operator is too aggressive in moving the probe, it is possible that he or she will cause deceleration which exceeds the threshold value. To prevent false triggering in this situation, the triggering routine is enabled only during times when the velocity is below a predetermined maximum value, thus motivating the operator to avoid aggressive movements.

Vibrations caused by nearby vehicular traffic or other environmental sources also present a risk of producing decelerations greater than the predetermined triggering value. To avoid this risk, the triggering routine is enabled only during times when the velocity is above a minimum value.

Another event which may cause false triggering is when an operator releases the probe so it decelerates due to friction in the mechanical components of the machine. To avert this, the computer enables the triggering routine only during times when the deceleration occurs within a predetermined minimum period of time.

The apparatus is also capable of producing, from the position indicating signals, vector-indicating signals which indicate the location of a surface normal line, i.e., a line which is normal to the workpiece surface at a point which is contacted by the probe. It is known in the metrology field that the surface normal line is needed to determine the direction for probe tip correction, for example to determine whether the probe tip is contacting an inside diameter or an outside diameter.

FIG. 5 shows a probe tip which has traveled along a path 40 to the data point P8 where it contacts the workpiece. Because the vibrations produced when the probe hits the workpiece are aligned with the surface normal line SN, the locus of the surface normal line can be and is identified by the coordinate velocity values in effect while the system is vibrating due to contact.

FIG. 6 illustrates this principle in a two dimensional system, but in normal practice a three dimensional system will be involved. The vibrations sensed by the x axis reading head 34 and the y axis reading head 18 will have amplitudes Ax and Ay respectively. The resultant vector Axy is coincident with the surface normal line.

In some situations it is desirable to scan a workpiece. In this specification, the term "scan" refers to the manual movement of the probe tip continuously along and in contact with the workpiece, in contrast to the procedure of FIG. 3 in which the probe tip is backed away from the workpiece between successive data points. While in the scanning mode illustrated in FIG. 5, the machine automatically periodically produces the final position-indicating signals as the probe moves along the surface which has data points P8, P9, P10, P11, P12, etc.

The scanning mode may be initiated automatically or in response to a command input by the operator. Automatic initiation occurs in response to probe movement in a direction which is lateral with respect to the surface normal line SN.

The direction of probe movement is determined from changes in probe location with respect to time. When this direction is lateral to the known surface normal line SN the machine, sensing that the operator is scanning the workpiece, initiates the scanning mode so that final position-indicating signals are automatically calculated and recorded at fixed time intervals so that readings are taken throughout the scanning procedure at data points P8, P9, P10, P11, etc. The feature which initiated the scanning mode can be automatically disabled at a predetermined time after the probe contacts a workpiece, so the operator must decisively commence the scanning movement after contact at point P8.

A further feature of the invention is that the apparatus can provide data indicating the direction of touch, i.e. the direction of travel when the probe comes into contact with the workpiece. In FIG. 5, the probe path is indicated by the broken line 40, and the direction of touch in the illustrated plane is represented by the line 42. This direction is coincident with a probe velocity vector calculated from the probe position data recorded immediately before the probe contacts the workpiece.

The calculating methods and any computer programming necessary to perform the calculations described hereinabove can be devised and written by persons skilled in the art based upon the preceding description. However, in the interest of full disclosure, a preferred manner of practicing the invention is described below.

The invention may be practiced with an IBM compatible personal computer ("PC") and a Galil motion controller board with counters which constitute the data acquisition system. The counters are interrogated by the PC in ASCII format with the overhead of ASCII conversion and PC bus handshaking and communication.

The triggering code is resident in the host PC. It sits in a logic and decision loop until conditions are met that indicate that the probe has contacted the workpiece. The clock cycle and the acquisition rate of three coordinates within the overall logic and decision loop is 0.002 seconds, or 500 Hz. In response to triggering, the system enters a data recording mode where it either performs calculations on the oscillating coordinate values to determine the equilibrium or nodal value, or waits for the oscillations to stop before taking a reading.

When the machine frame is being manipulated normally by the operator prior to contact, is does not decelerate as rapidly as it does when contact occurs between the probe and the workpiece. Such contact can be detected when the deceleration value exceeds a predetermined threshold value.

The magnitude of a suitable deceleration threshold value will differ from axis to axis because each axis of the machine has a different response to contact. For example, in a machine sold under the trademark MICRO-VAL, the Y axis components have the most mass and the lowest spring constant. Along this axis, it takes typically 50-75 milliseconds for the scale read head to decelerate completely from the probing velocity (2-3 mm/sec) to zero velocity. With respect to the Z axis, the machine has the least mass and the axis is directly in line with the part. The deceleration time associated with this axis is about 3-10 milliseconds which is barely measurable at data acquisition speeds of 500 Hz.

A simplified psuedo code is as follows:

```
REPEAT
    Set PREVIOUS Coordinate = CURRENT Coordinate
    Set PREVIOUS Velocity = CURRENT Velocity
    READ New Machine CURRENT Coordinate
    CALCULATE  New CURRENT Velocity
               PREVIOUS - CURRENT Coordinate
    CALCULATE  New Acceleration
               PREVIOUS - Current Velocity
UNTIL ( Acceleration < Deceleration Threshold)
```

Various conditions can result in false triggering unless precautions are taken. To avoid the risk of false triggering when an operator moves the probe too aggressively, the algorithm is enabled only when the velocity is below a suitable predetermined value. To prevent false triggering when a probe is released by an operator and decelerates due to frictional forces, the algorithm is enabled only if the deceleration curve has a short frequency, i.e. a duration which is less than a suitable predetermined time period. Thus, triggering will occur only if there is a "fresh" deceleration curve. To avert false triggering by environmental vibrations when the machine is not in use, the algorithm is enabled only if the machine has recently been moving at a velocity which exceeds a predetermined minimum value.

Because of the nature of the computation of acceleration, which is the slope of a slope, the digital quantization of the scale values gets magnified by the acceleration computation, thus causing a very high digital noise level.

Under velocities and accelerations normally experienced when moving a probe from one contact point to another, the digital noise level may be higher than the deceleration threshold value. This noise is a mathematical phenomenon superimposed on the signal that must oscillate about the signal value in equal proportions. When the probe contacts a workpiece, this noise seems to disappear.

It has been noted that (1) the longer the clock cycle of the loop the lower the noise level appears to be (the slope of the slope is factored by the time base); and, (2) if the clock cycle is too long, a very high frequency deceleration such as the one on the Z axis is difficult to detect for comparison with the threshold value. In view of these factors, the system may use a digital filter that smoothes the digital signals and is fast enough to detect contact. A modified and simplified median filter is used. The ring buffer allows the implementation of this filter simply without large quantities of real time computation.

The sum of all the signal values within a filter width following the current pointer are tracked. This sum value is maintained by simply adding the current acceleration and subtracting the last acceleration in the filter width as follows:

$$SUM = SUM + CURRENT - LAST$$

The main advantage this has over a strict median filter is computational simplicity. There is no need to divide by the units of filter width because units of measurement do not have to be strictly maintained, and "fudge" threshold values can be used to cause the system to trigger under appropriate conditions.

It was found that testing and debugging codes changed the behavior of the algorithm. To avert this problem, a "flight recorder" procedure is used to post-display the data for testing and tuning purposes without impacting the behavior of the algorithm.

A ring buffer was implemented in the algorithm which keeps a running recording of the instantaneous coordinate (i.e., position), velocity and acceleration with respect to each axis. The ring buffer had an arbitrary length of 70 records. Each record consisted of individual X, Y, Z coordinates, X, Y, Z velocities, X, Y, Z accelerations.

The ring buffer may be any size which provides more records than the filter width. In this case the filter width was only 6 cycles of the loop or six records of the buffer.

This ring buffer has the following three pointers into location spots on the array:

Current Point ("CURPNT")—The most recent data point and the one currently being processed in the logic and decision loop.

Previous Point ("PRVPNT")—The point that occurred just prior to the current point.

Last Point ("LASPNT")—The point that occurred a filter width value prior to the current point.

The ring buffer is as follows:

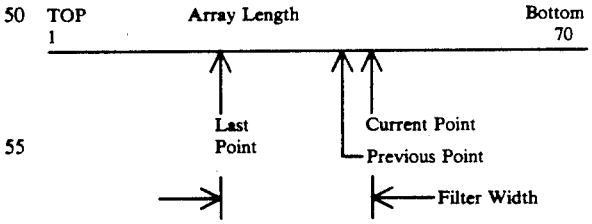

Each cycle of the logic and decision loop causes the pointer to move over one record slot in the array. When a pointer reaches the bottom or end of the array it is reset to the top.

An implemented pseudo code for triggering a hit sequence is as follows:

DYNCOR ( 3 , 70 )array of coordinates

-continued

```
DYNVEL ( 3 , 70 )array of velocities
DYNACC ( 3 , 70 )array of accelerations
dynamic arrays used for data storage in ring buffer
FILWIDTH = 6
CURPNT = FILWIDTH            "Filter Width"
LASPNT = 0
SUMVEL = 0       "Sum of Vel values within filter"
SUMACC = 0       "Sum of Acc values within filter"
ARMED = FALSE
  FRQ. THRESHOLD  6 Cycles of the loop
               =
  ACC. THRESHOLD  x = −0.015( mm/ 6 cycles **2 )
               =
                  y = −0.010      Acceleration
                  z = −0.025      Threshold
  VEL. THRESHOLD  x = 0.2    (mm/ 6 cycles) Velocity Threshold
                  y = 0.2
                  z = 0.2
  ARM. THRESHOLD  x = 0.02 (mm/ 6 cycles) Arming Threshold
                  y = 0.02
                  z = 0.02
REPEAT
  Bump Up Pointers
  PRVPNT = CURPNT ;
  IF CURPNT = 70 THEN CURPNT=1    ELSE CURPNT=CURPNT+1
  IF LASPNT = 70 THEN LASPNT=1    ELSE LASPMT=LASPMT+1
  READ MACHINE Coordinates → DYNCOR (  CURPNT )
  Loop through all three axes
  FOR AX=1 to 3
          Calculate Velocity
          DYNVEL( AX , CURPNT ) =
               DYNCOR( AX , CURPNT ) - DYNCOR( AX, PRVPNT )
  Calculate Acceleration
  IF ( DYNVEL( AX , CURPNT ) < 0 )
  THEN
      DYNACC( AX , CURPNT ) =
          DYNVEL( AX , PRVPNT ) - DYNVEL( AX , CURPNT )
  ELSE
      DYNACC( AX , CURPNT ) =
          DYNVEL( AX , CURPNT ) - DYNVEL( AX , PRVPNT )
  Calculate Velocity Filter
  SUMVEL( AX ) = SUMVEL( AX ) +
          DYNVEL( AX , CURPNT ) - DYNVEL( AX , LASPNT )
  Calculate Acceleration Filter
  8UMACC( AX ) = SUMACC( AX ) +
          DYNACC( AX , CURPNT ) -DYNACCI( AX, LASPNT )
  Counter since this wave was last at zero
  IF ( SUMACC( AX ) =0 )
  THEN
      FRESHWAVE( AX ) = 0
  ELSE
      FRESHWAVE( AX ) = FRESHWAVE( AX ) + 1
  See if we should arm test???
  IF ( SUMVEL( AX ) > ARM.THRESHOLD( AX ) )
  THEN
      ARMED = TRUE
  NEXT AX
  UNTIL       (   (ARMED)AND
                   make sure algorithm is armed
                   (ABS(SUMVEL(1))    <VEL.THRESHOLD(1) )AND
                   (ABS(SUMVEL(2))    < VEL.THRESHOLD(2) )AND
                   (ABS(SUMVEL(3))    < VEL.THRESHOLD(3) )AND
                   make sure "all" axes are below a threshold
velocity
              ((   (FRESHWAVE(1)     < FRQ.THRESHOLD(1) )  AND
                   (SUMACC(1)        < ACC.THRESHOLD(1) )  ) OR
               (   (FRESHWAVE(2)     ≥ FRQ.THRESHOLD(2) )  AND
                   (SUMACC(2)        < ACC.THRESHOLD(2) )  ) OR
               (   (FRESHWAVE(3)     < FRQ.THRESHOLD(3) )  AND
                   (SUMACC(3)        < ACC.THRESHOLD(3) )  ) ) )
                   make sure "a" axis has a fresh accel wave
                   that goes below our deceleration threshold
```

Here, the algorithm has been triggered that a contact has occurred

```
Calculate Surface Normal Vector
  LENGTH = SQRT ( SUMVEL( 1 )**2 +
                  SUMVEL( 2 )**2 +
                  SUMVEL( 3 )**2 )
```

```
     FOR AX=1 to 3
         SURFACE NORMAL( AX ) = −1.0 * SUMVEL( AX ) / LENGTH
```

At this point, the system is entering a piece of code that waits until "bouncing" stops and then averages coordinates into a single reading.

```
SET.VEL.THRESHOLD  = 0.005 (mm / 6 cycles)
                   y = 0.005
                   z = 0.005
SET.CNT.THRESHOLD  = 20( Equals 40 millisecond Delay )
MAXNUMPTS      = 50
COUNTER        = 0
NUMPTS         = 0
REPEAT
     Bump Up Pointers
     PRVPNT = CURPNT ;
     IF CURPNT = 70 THEN CURPNT=1   ELSE CURPNT=CURPNT+1
     READ MACHINE Coordinates → DYNCOR( CURPNT )
     FOR AX=1 to 3
         Calculate Velocity
         DYNVEL( AX, CURPNT ) =
             ABS( DYNCOR( AX , CURPNT ) - DYNCOR( AX, PRVPNT))
     Check to See If the system is Settling Down
     IF ( DYNVEL( AX , CURPNT )   <SET.VEL.THRESHOLD( AX ))
     THEN
         COUNTER = 0
         READING(1) = 0
         READING(2) = 0
         READING(3) = 0
         NUMPTS = 0
     ELSE
         COUNTER = COUNTER + 1 ;
     NEXT AX
Check to see If Bouncing Stops
IF ( COUNTER >SET.CNT.THRESHOLD )
THEN
         READING(1) = READING(1) + DYNCOR( 1 , CURPNT )
         READING(2) = READING(2) + DYNCOR( 2 , CURPNT )
         READING(3) = READING(3) + DYNCOR( 3 , CURPNT )
         NUMPTS = NUMPTS = + 1
UNTIL( NUMPTS = MAXNUMPTS )
READING = READING / NUMPTS
```

The invention may take many forms. The workpiece-contacting portion of the probe can be spherical, conical, disc shaped, half-flat, rotating, or other forms which are known in the art. Hardware may be built to perform some of the computer functions. For example, signals from the reading heads may be processed by a frequency to analog converter to determine the velocity. The analog velocity could then be differentiated to acceleration.

The scales may be of any conventional type such as inductive, Moire fringe, phase quadrature, interferometric, etc. The coordinate axis system may have less than three axes, and it may have one or more nonlinear axes. Instead of being stationary, the workpiece may be movable in one or more coordinate axis directions. The computations can be performed by a general purpose computer, or by an EPROM on a chip specifically programmed to perform calculations according to the invention.

In view of the many ways the invention can be practiced, it is emphasized that the invention, rather than being limited to the embodiments illustrated and mentioned herein, is embracing of a wide variety of machines and methods which fall within the spirit of the following claims.

We claim:

1. A coordinate measuring machine, comprising, workpiece support means for supporting a workpiece, probe support means for supporting a probe, a hard probe mounted on said probe support means, said probe having a contacting end for contacting a workpiece on the workpiece support means, said probe having a mounting end which is rigidly connected to the probe support means and to said contacting end of the probe, said workpiece support means and said probe support means being supported for manual movement relative to each other along coordinate axes so that said probe may be brought into contact with a workpiece on the workpiece support means, position-sensing means for providing position-indicating signals which indicate positions of said support means relative to each other along each coordinate axis, signal processing means including means for recording a set of sequential position-indicating signals from the position-sensing means, and means for producing, from said set of recorded signals, a final position-indicating signal, said machine, upon manual movement of said probe into contact with a workpiece, producing mechanical vibrations between the position-sensing means and a point where the contacting end of the probe touches the workpiece, said vibrations having amplitudes which are included in said recorded signals, said means for producing a final position-indicating signal being a calculating means for performing calculations with said recorded signals to produce a final position-indicating signal which substantially represents an equilibrium position of the vibrations sensed by the position-sensing means.

2. A coordinate measuring machine according to claim 1 wherein said calculating means takes an average of said recorded signals to obtain the final position-indicating signal.

3. A coordinate measuring machine, comprising,
workpiece support means for supporting a workpiece,
probe support means for supporting a probe,
a hard probe mounted on said probe support means, said probe having a contacting end for contacting a workpiece on the workpiece support means, said probe having a mounting end which is rigidly connected to the probe support means and to said contacting end of the probe,
said workpiece support means and said probe support means being supported for manual movement relative to each other along coordinate axes so that said probe may be brought into contact with a workpiece on the workpiece support means,
position-sensing means for providing position-indicating signals which indicate positions of said support means relative to each other along each coordinate axis,
signal processing means including means for recording a set of sequential position-indicating signals from the position-sensing means, and means for producing, from said set of recorded signals, a final position-indicating signal, and
means for determining deceleration of said movement based on said recorded signals, said means for producing a final position-indicating signal being triggered to produce said final position-indicating signal when the determined deceleration reaches a threshold value which indicates that the contacting end of the probe has contacted a workpiece.

4. A coordinate measuring machine according to claim 3 wherein, to reduce a risk of false triggering of the signal processing means when deceleration is due to aggressive movement by an operator rather than by contact of the probe with a workpiece, the means for producing a final position-indicating signal is enabled only during times when said movement has a velocity which is below a predetermined maximum value.

5. A coordinate measuring machine according to claim 3 wherein, to prevent false triggering of the signal processing means when a operator releases the probe so that deceleration occurs due to friction, the means for producing a final position-indicating signal is enabled only when the determined deceleration occurs within a predetermined minimum period of time.

6. A coordinate measuring machine according to claim 3 wherein, to prevent false triggering of the signal processing means due to environmental vibrations, the means for producing a final position-indicating signal is enabled only during times when said movement has a velocity which is above a predetermined minimum value.

7. A coordinate measuring machine, comprising,
workpiece support means for supporting a workpiece,
probe support means for supporting a probe,
a hard probe mounted on said probe support means, said probe having a contacting end for contacting a workpiece on the workpiece support means, said probe having a mounting end which is rigidly connected to the probe support means and to said contacting end of the probe,
said workpiece support means and said probe support means being supported for manual movement relative to each other along coordinate axes so that said probe may be brought into contact with a workpiece on the workpiece support means,
position-sensing means for providing position-indicating signals which indicate positions of said support means relative to each other along each coordinate axis,
signal processing means including means for recording a set of sequential position-indicating signals from the position-sensing means, and means for producing, from said set of recorded signals, a final position-indicating signal, and
means for operating the machine in a scanning mode in which final position-indicating signals are automatically produced periodically while the probe is manually moved along and in contact with a workpiece surface.

8. A coordinate measuring machine according to claim 7 including means for initiating said scanning mode in response to said movement in a direction which is lateral with respect to a line which is normal to the workpiece surface at a point which is contacted by the probe.

9. A coordinate measuring machine according to claim 8 in which the means for initiating said scanning mode is enabled when the probe contacts a workpiece, and the means for initiating the scanning mode is disabled at a predetermined time after the probe contacts a workpiece.

10. A coordinate measuring machine according to claim 7 having means for producing, from said position-indicating signals, vector-indicating signals which indicate the location of a surface normal line which is normal to the workpiece surface at a point which is contacted by the probe.

11. A coordinate measuring machine according to claim 10 including means for initiating said scanning mode in response to probe movement which is lateral to said surface normal line.

12. A coordinate measuring machine, comprising,
workpiece support means for supporting a workpiece,
probe support means for supporting a probe,
a hard probe mounted on said probe support means, said probe having a contacting end for contacting a workpiece on the workpiece support means, said probe having a mounting end which is rigidly connected to the probe support means and to said contacting end of the probe,
said workpiece support means and said probe support means being supported for manual movement relative to each other along coordinate axes so that said probe may be brought into contact with a workpiece on the workpiece support means,
position-sensing means for providing position-indicating signals which indicate positions of said support means relative to each other along each coordinate axis,
signal processing means including means for recording a set of sequential position-indicating signals from the position-sensing means, and means for producing, from said set of recorded signals, a final position-indicating signal, and means for producing, from said recorded signals, vector-indicating signals which indicate the location of a surface normal line which is normal to the workpiece surface at a point which is contacted by the probe.

13. A coordinate measuring machine according to claim 12 wherein the machine is operable in a scanning mode in which position-indicating signals are automatically recorded periodically while the probe is moved along the surface of a workpiece in contact therewith, and means for initiating said scanning mode in response to probe movement which is lateral to said surface normal line.

14. A coordinate measuring machine, comprising, workpiece support means for supporting a workpiece, probe support means for supporting a probe, a hard probe mounted on said probe support means, said probe having a contacting end for contacting a workpiece on the workpiece support means, said probe having a mounting end which is rigidly connected to the probe support means and to said contacting end of the probe, said workpiece support means and said probe support means being supported for manual movement relative to each other along coordinate axes so that said probe may be brought into contact with a workpiece on the workpiece support means, position-sensing means for providing position-indicating signals which indicate positions of said support means relative to each other along each coordinate axis, signal processing means including means for recording a set of sequential position-indicating signals from the position-sensing means, and means for producing, from said set of recorded signals, a final position-indicating signal, and means for producing, from said position-indicating signals, a direction-of-touch signal which indicates the direction of movement immediately preceding contact of the probe with a workpiece.

* * * * *